UNITED STATES PATENT OFFICE.

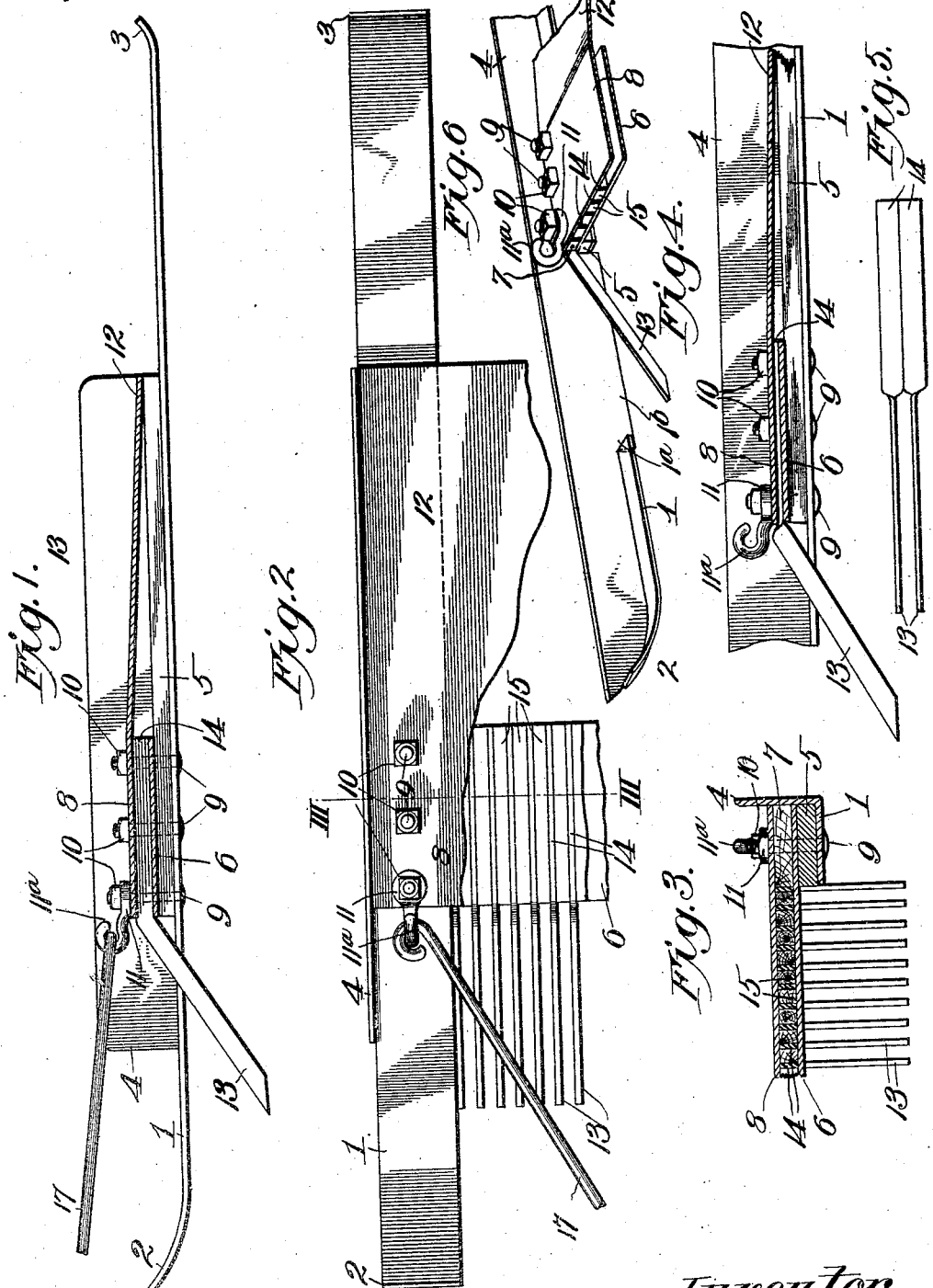

MICHAEL A. POPKESS, OF KANSAS CITY, MISSOURI.

EARTH-RAKE.

No. 929,486.      Specification of Letters Patent.      Patented July 27, 1909.

Application filed October 6, 1908. Serial No. 456,505.

*To all whom it may concern:*

Be it known that I, MICHAEL A. POPKESS, a citizen of the United States, residing at Kansas City, in the county of Jackson and State of Missouri, have invented certain new and useful Improvements in Earth-Rakes, of which the following is a specification.

This invention relates to earth rakes and my object is to produce a rake having teeth for picking rocks and clods of earth from loosened ground and depositing them upon a plate from which the rocks may be collected or thrown off the roadway and upon which the clods may be crushed or pulverized and in such condition redeposited upon the ground in the wake of the machine.

A further object is to produce an implement of this character which will operate efficiently and reliably and embodies the desirable features of simplicity, strength, durability and cheapness of construction.

With these general objects in view the invention consists in certain novel and peculiar features of construction and combinations of parts as hereinafter described and claimed; and in order that it may be fully understood reference is to be had to the accompanying drawing, in which:—

Figure 1 is a vertical longitudinal section of a machine embodying my invention. Fig. 2 is a top plan view of a part of the machine. Fig. 3 is a cross section taken on the line III—III of Fig. 2. Fig. 4 is a section corresponding to Fig. 1, of a slightly modified construction. Fig. 5 is a plan view showing the relative arrangement of adjacent teeth of the type of construction illustrated by Fig. 4. Fig. 6 is a sectional perspective view of a second modified construction.

In the said drawings, 1 indicates a pair of parallel runners (one only appearing) having their front ends upturned as at 2 and their rear ends also upturned by preference as at 3, and provided at their side margins with upwardly projecting flanges 4 which serve to stiffen the runners and also perform another function hereinafter explained.

Each runner is provided with a bar 5 and bridging the space between the runners is a bridge-plate 6, which, by preference, rests upon the front ends of bar 5.

7 indicates spacing bars (Figs. 1 to 4 inclusive and Fig. 6) resting upon the bridge-plate 6 above the runners and 8 a top plate paralleling the bridge-plate and resting upon bars 7.

9 indicates bolts extending through each runner and the superposed bars and plates, and 10 clamping nuts engaging the upper ends of said bolts to clamp said parts rigidly together, and mounted on the foremost bolt of each runner is a washer 11 provided with a hook or eye $11^a$, it being noticed in this connection that flanges 4 preferably project some distance above the top plate and that the latter has an extension 12 which rests upon the rear ends of bars 5.

13 indicates a series of parallel rake teeth extending downward and forward from the front edge and upper side of bridge plate 6, and provided with horizontal stems 14 fitting snugly between said bridge plate and the overlying portion of the top plate, and fitting snugly between the stems of said teeth are spacing blocks 15, which, with said stems are clamped by the top plate firmly and immovably upon the bridge plate. Any suitable draft-connection may be employed, the drawing showing one of a pair of rods 17 attached to the hook or eye $11^a$, the front ends of said rods 17 being adapted to have the draft animals attached to them.

This machine is intended to rake through ground which has been plowed and then harrowed for the purpose of breaking up all of the large clods. After the ground has been thus treated the rake is drawn over it and in such passage most of the loose or fine earth will pass through the interstices between the teeth, the bridge-bar being raised above the level of the runners so as to provide ample room for such fine earth to pass under it. The clods and rocks too large to pass between the teeth will ride upwardly upon the latter and upon the top plate and as they attain such position, workmen standing upon the top plate, will crush the clods by any suitable crushing device or pounder, not shown, and pick up and either throw the rocks off the roadway or deposit them in a suitable receptacle, not shown, which may rest upon the runners rearward of the top plate, the upturned rear ends of the runners retaining such receptacle in such position. The operator will be mainly employed in crushing the clods but as the machine will travel slowly, he will have ample time to also dispose of the stones or rocks as explained. In the progress of the machine the crushed earth will tend to slide rearwardly off the top plate and drop upon the ground in the wake of the machine, it being of course apparent that there will actually be a continual stream of the earth off the rear end of the machine because of the rearward pressure of that which is riding up and rearward over the teeth as long as the machine is in motion.

In Fig. 4, the stems of the teeth are preferably disposed at an angle of ninety degrees to the teeth as shown in Figs. 1, 2 and 3, this being accomplished by a twist at the junction of the stems and teeth. Where this construction is followed, the width of the stems is, of course, greater than as shown in Figs. 1 to 3 so that when the teeth are arranged with their stems abutting, the former are spaced apart without the interposition of spacing bars 15 between the stems, the latter being clamped tightly between the bridge plate and the top plate as before explained.

In Fig. 6 I show a construction whereby a roadway may be raked from curb to curb as distinguished from the construction shown in the preceding figures, in which it will be noticed the comparatively wide runners are disposed outward of the endmost teeth. In said Fig. 6, the runner shown is preferably narrower than the runners of the other figures and is also cut away to provide an opening 1ª, to permit the endmost teeth to be disposed against the flanges 4 and consequently perform their raking function almost in contact with the street curbing, that part of the runner cut away to form opening 1ª, being preferably bent downward as at 1ᵇ in the plane of the flange 4, so as to increase the strength of the latter. In other respects the construction and arrangement of the parts of Fig. 6 are substantially the same as in Figs. 1 to 3 inclusive, it being obvious, of course, that the bar 5 is narrower than in the preceding figures and that bar 7 is a duplicate in size and proportion of spacing bars 15. Should it be desired to rake the ground to a greater or less proportional depth than as shown in the drawing, the clamping nuts will be unscrewed sufficiently to permit the teeth to be withdrawn and replaced by others of greater or smaller size accordingly as it is desired to rake to a greater or less depth, the ends being then screwed home to clamp the new teeth in position.

From the above description it will be apparent that I have produced a rake by which rocks and clods may be removed from harrowed or other loosened ground to permit the rocks to be collected or thrown off the roadway and the clods to be crushed, and which obviously will perform such function efficiently and reliably. The pull of the draft animals and the angularity of the teeth maintain the latter at the desired depth and the runners by bearing upon the ground a suitable distance forward of the teeth, guard against any tendency of the rake to swing forwardly and upwardly in the event of the teeth encountering an unusual resistance. It will be apparent of course, that the rake is susceptible of modification in its form, proportion, detail construction and organization without departing from the spirit and scope of the appended claims.

Having thus described the invention what I claim as new and desire to secure by Letters Patent, is:—

1. A rake, comprising ground-engaging supports, a rigid connection extending transversely from one of said supports to the other, and rake-teeth carried by and extending downwardly and forwardly from said connection rearward of points of engagement with the ground of said ground-engaging devices.

2. A rake, comprising a pair of parallel runners, bars upon said runners, a bridge-plate between the runners and resting upon said bars, rake teeth extending downward and forward from said bridge-plate and having rearwardly extending stems resting upon the latter, a top plate resting upon the stems of the teeth, and means to clamp said top plate firmly down upon said stems.

3. A rake, comprising a pair of parallel runners, bars upon said runners, a bridge-plate between the runners and resting upon said bars, rake teeth extending downward and forward from said bridge-plate and having rearwardly extending stems resting upon the latter, a top plate resting upon the stems of the teeth, bolts extending through the runners, bars, bridge plate and top plate, and clamping nuts engaging said bolts to clamp said parts rigidly together and the stems of the teeth rigidly between the bridge-plate and top plate.

4. A rake comprising a pair of runners, a bridge-plate connecting said runners, a series of teeth secured to said bridge-plate and extending downwardly and forwardly therefrom, and a top plate overlying the bridge plate and bearing a fixed relation thereto and projecting rearwardly thereof and downwardly.

5. A rake comprising a pair of runners provided with upwardly projecting flanges at their outer margins, bars resting upon the runners between said flanges, a bridge-plate between the runners and resting at its ends on said bars, a series of teeth extending downwardly and forwardly from the bridge-plate and provided with stem portions upon the latter, a top plate resting upon said stems and disposed below the upper edge of the flanges, means to clamp the said bars, bridge-plate, top plate and teeth firmly to each other and to the runners, and a draft connection for pulling the implement forwardly over the ground.

6. A rake comprising a pair of runners equipped at their outer sides with upwardly-projecting flanges, a pair of bars resting upon said runners between the flanges thereof, a bridge-plate resting upon said bars forward of the rear ends of the same, a series of parallel rake teeth extending downwardly and forwardly from the bridge-plate and provided with stems resting flatly upon the latter, spacing bars also resting upon the bridge-plate and interposed between the stems of the teeth, a top plate resting upon said teeth and spacing bars, and means to clamp said top plate firmly down upon the stems of the teeth and said spacing bars.

7. A rake comprising a pair of runners equipped at their outer sides with upwardly-projecting flanges, a pair of bars resting upon said runners between the flanges thereof, a bridge-plate resting upon said bars forward of the rear ends of the same, a series of parallel rake teeth extending downwardly and forwardly from the bridge-plate and provided with stems resting flatly upon the latter, spacing bars also resting upon the bridge-plate and interposed between the stems of the teeth, a top plate resting upon said teeth and spacing bars, and provided with an extension projecting rearwardly beyond the stems of the teeth and the bridge-plate and pitched downwardly toward such rear end, and means to secure the first-named bars, the bridge-plate, the teeth, the spacing bars and the top plate in rigid relation to each other and the runners.

8. A rake, comprising a pair of runners, a connection between said runners rearward of their front ends, and a series of teeth extending downward and forward from said connection to a plane a material distance below the horizontal plane of the runners and terminating at their front ends rearward of the front ends of the runners.

In testimony whereof I affix my signature, in the presence of two witnesses.

MICHAEL A. POPKESS.

Witnesses:
H. C. RODGERS,
G. Y. THORPE.